United States Patent
Brandwine et al.

(10) Patent No.: US 9,584,325 B1
(45) Date of Patent: Feb. 28, 2017

(54) USER-CONFIGURABLE CRYPTOGRAPHIC INTERFACE CONTROLLER

(71) Applicant: Amazon Technologies, Inc., Seattle, WA (US)

(72) Inventors: Eric Jason Brandwine, Haymarket, VA (US); Robert Eric Fitzgerald, Herndon, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 257 days.

(21) Appl. No.: 14/561,093

(22) Filed: Dec. 4, 2014

(51) Int. Cl.
| | |
|---|---|
| *H04L 9/32* | (2006.01) |
| *H04L 9/08* | (2006.01) |
| *H04L 29/06* | (2006.01) |

(52) U.S. Cl.
CPC .............. *H04L 9/3234* (2013.01); *H04L 9/08* (2013.01); *H04L 63/0853* (2013.01)

(58) Field of Classification Search
CPC ...... H04L 9/3234; H04L 9/08; H04L 63/0853
See application file for complete search history.

(56) References Cited

U.S. PATENT DOCUMENTS

| | | | | |
|---|---|---|---|---|
| 8,977,842 | B1* | 3/2015 | McCorkendale | G06F 21/53 380/285 |
| 9,009,817 | B1* | 4/2015 | Wieland | G06F 21/34 713/186 |
| 2006/0020781 | A1* | 1/2006 | Scarlata | G06F 21/53 713/100 |
| 2006/0256105 | A1* | 11/2006 | Scarlata | G06F 21/53 345/418 |
| 2009/0086979 | A1* | 4/2009 | Brutch | H04L 9/0836 380/279 |
| 2010/0063906 | A1* | 3/2010 | Nelsen | G06Q 20/28 705/30 |
| 2013/0290717 | A1* | 10/2013 | Hart | G06F 21/602 713/168 |

* cited by examiner

*Primary Examiner* — Darren B Schwartz
(74) *Attorney, Agent, or Firm* — Davis Wright Tremaine LLP (57) ABSTRACT

Systems and methods for scalably provisioning cryptographic devices in a distributed computing environment are described. In some embodiments, a cryptographic interface controller capable of generating a plurality of hardware-emulated cryptographic devices in response to requests is implemented. In some embodiments, a cryptographic interface controller may present hardware-emulated cryptographic devices to computing entities, such as standalone computer systems or virtual computing systems, as standard cryptographic devices, such as through a Universal Serial Bus interface.

20 Claims, 8 Drawing Sheets

USER-CONFIGURABLE CRYPTOGRAPHIC INTERFACE CONTROLLER

BACKGROUND

Cryptographic authentication and processing, and the management thereof, is an important part of modern data security. As computing requirements and data volumes increase over time, the technical requirements of ensuring the security thereof also increase. Various types of cryptoprocessors exist for managing and processing cryptographic information, such as hardware security modules (HSMs), trusted platform modules (TPMs), and smart cards, many of which are capable of processing data and attendant cryptographic operations. However, as computing architectures evolve toward more multipolar, distributed models, such as cloud computing archetypes, flexible servicing and provisioning of cryptographic capabilities are desirable from the perspectives of efficiency, capacity, and capability.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for scalably provisioning cryptographic devices in a distributed computing environment. For example, a cryptographic interface controller capable of generating a plurality of hardware-emulated cryptographic devices in response to requests is described. In some embodiments, a cryptographic interface controller may present hardware-emulated cryptographic devices to computing entities, such as standalone computer systems or virtual computing systems, as standard cryptographic devices, such as through a Universal Serial Bus interface. A cryptographic interface controller, or a computing entity connected therewith, may interface with a separate cryptographic device or engine in such a way as to forward the processing of incoming requests for cryptographic operations (such as decryption, encryption, token information/description requests, and the like, such as the operations specified by the Public Key Cryptographic Standards #11 Cryptographic Token Interface Standard (PKCS#11 Cryptoki API)) to such cryptographic devices or engines. While PKCS#11 and the PKCS#11 Cryptoki API are a focus of this disclosure, cryptographic devices, engines, and other entities reliant on cryptographic standards may use any appropriate cryptographic standards or cryptographic interface standards as required by the specific implementation. Other than the PKCS standards, such as PKCS#11 and the Cryptoki API, such standards may include Microsoft Cryptographic Application Programming Interface (CAPI), Microsoft Cryptographic API: Next Generation (CNG), Java Cryptography Architecture (JCA), Java Cryptography Extension (JCE), and/or OpenSSL.

The cryptographic devices or engines may be under control of a provider of cryptographic services, under control of a customer of such services, under control of a third party, or some combination thereof. Similarly, cryptographic keys, such as private keys of asymmetric key pairs, may be under customer control, provider control, third party control, or some combination thereof. In certain embodiments, such cryptographic keys may be directly loaded onto, and/or manipulated by, the cryptographic interface controller. In some embodiments, the cryptographic interface controller may directly service incoming cryptographic requests using its own cryptoprocessor or other cryptographic engine.

Some applications for the techniques described herein include implementations of a cryptographic interface controller in distributed computing environments. For example, a cryptographic interface controller may be utilized to generate hardware-emulated cryptographic devices upon the request of a customer or the customer's associated customer computing entity. Such hardware-emulated cryptographic devices may be scaled as designated by the requester, or, in some embodiments, may be scaled automatically by the cryptographic interface controller in accordance with detected demand for, e.g., additional performance or capacity to perform cryptographic operations. In some embodiments, such scaling may occur dynamically as usage or other demands change over time.

In certain embodiments, hardware-emulated cryptographic devices may be operably attached to one or more computing entities of a provider of distributed computing services, such as provisioned computing instances thereof. Hardware-emulated cryptographic devices may be attached to computing entities accessible to customers or customer computing entities. In some embodiments, the hardware-emulated cryptographic devices may be used to obfuscate, pool, or load balance cryptoprocessors or other cryptographic devices so as to provide a unified cryptographic interface for computing entities or consumers potentially attaching therewith.

Figure 1:
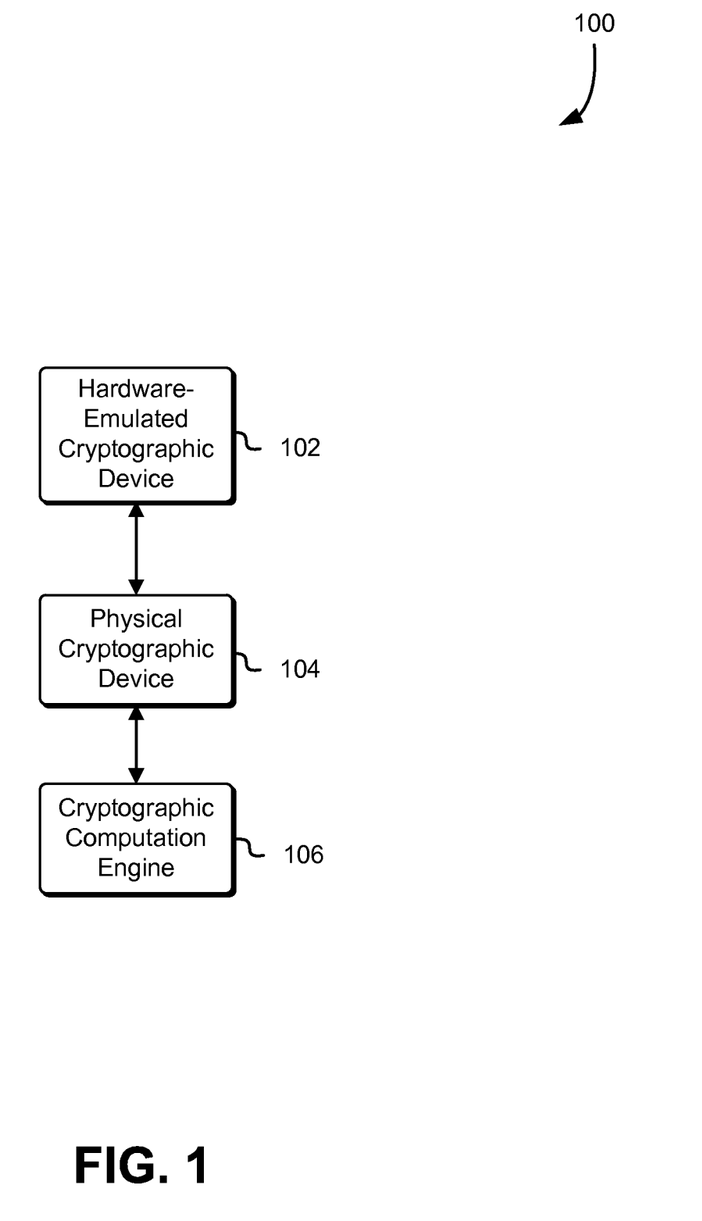
FIG. 1 illustrates an example of a cryptographic interface controller in accordance with some embodiments.

FIG. 1 diagrammatically illustrates a functionality stack of some embodiments utilizing a cryptographic interface controller. As illustrated, in some embodiments, a hardware-emulated cryptographic device 102, such as may be generated by a cryptographic interface controller 202 described below in connection with FIG. 2, interacts with a physical cryptographic device 104, such as a cryptoprocessor, which in turn interacts with a cryptographic computation engine 106 (such as a cryptographic computation engine 204 as described below in connection with FIG. 2).

Figure 2:
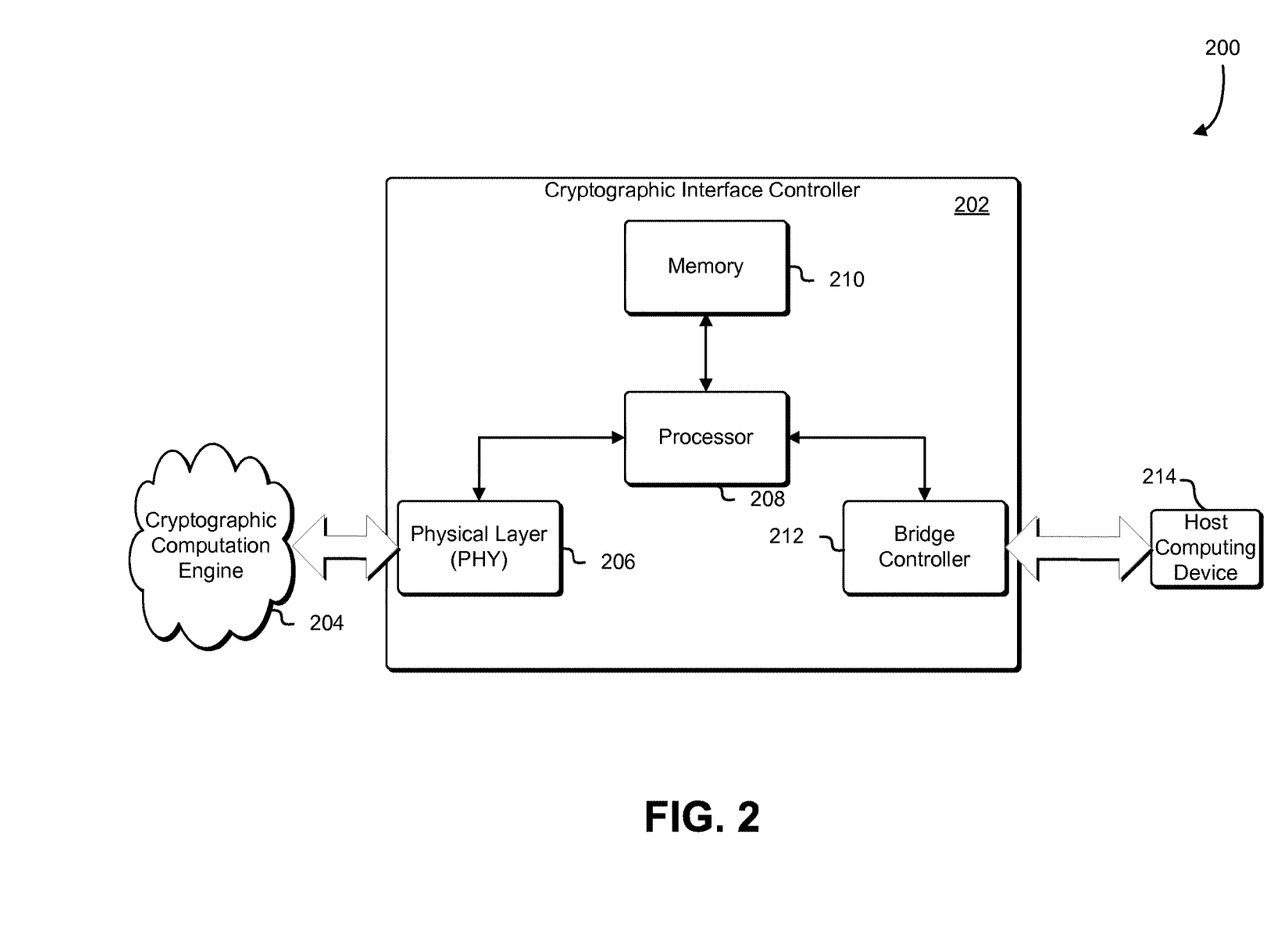
FIG. 2 illustrates an example of operational layers of one or more environments in which a cryptographic interface controller may be implemented in accordance with some embodiments.

In some embodiments, the functionality of the hardware-emulated cryptographic device 102, the physical cryptographic device 104, and the cryptographic computation engine 106, may reside on separate physical entities, or fully or partially combined onto the same physical entity. For example, a hardware emulated cryptographic device 102 may be generated by a physical cryptographic interface controller 102, which also provides a cryptographic application program interface (API), such as Cryptoki, to a cryptographic computation engine 106 implemented thereon. As an alternate example, a cryptographic interface controller 202 may generate a hardware-emulated cryptographic device 102, which is operably connected (possibly through the cryptographic interface controller 202) to a physical smart card, which serves as a physical cryptographic device 104 upon which the cryptographic computation engine 106 is implemented. As another example, a cryptographic interface controller 202 may generate a hardware-emulated cryptographic device 102, which is operably connected to a physical smart card (serving as physical cryptographic device 104) through a provider's computing entity, which in turn is operably connected to an off-box cryptoprocessor or hardware security module (HSM), upon which a cryptographic computation engine is implemented. As may be contemplated, the examples provided herein are not exhaustive, and the functionality stack may implement any configuration or quantity of devices to suit the particular environment in which the functionality described herein is implemented.

FIG. 1 schematically illustrates an example of a cryptographic interface controller and an environment 200 in which the cryptographic interface controller may be implemented. A cryptographic interface controller 202 may, in some embodiments, connect or otherwise associate with a cryptographic computation engine 204 through, for example, a physical hardware layer (PHY) 206 of the cryptographic interface controller. The cryptographic interface controller may further comprise of a processor 208 and memory 120, and may connect or otherwise associate to a host computing device 214 through bridge controller 212.

The cryptographic interface controller 202 may, in some embodiments, be in the form of an expansion card (e.g., to plug in to a server backplane or expansion slot), or may be a standalone device that is physically or otherwise operatively connected to a host computing device 214. For example, in the illustrated example, a cryptographic interface controller 202 connects through a bridge controller 212 to host computing device 214. In some embodiments, the bridge controller 212 may be a Peripheral Component Interconnect (PCI) or Peripheral Component Interconnect Express (PCIe) bridge, in which case the controller physically and electrically connects with the host computing device 214 via a PCI or PCIe data bus. In some embodiments, the bridge controller 212 may use a higher level standard hardware interface, such as a version of the Universal Serial Bus (USB) standard, to connect with host computing device 214. Other examples of connections between the cryptographic interface controller 202 and host computing device 214 as enabled by bridge controller 212 include, but are not limited to, wired or wireless network/Ethernet connections, Small Computer System Interface (SCSI) connections, Fibre Channel (FC) connections, Thunderbolt connections, and the like. The host computing device 214 may be any suitable computing entity capable of interfacing with the cryptographic interface controller 202. Examples include, but are not limited to, computer systems such as servers and workstations, virtual computing systems, virtual computing devices and related abstractions, cryptoprocessors, hardware security modules (HSMs), storage devices such as network-attached storage (NAS) units, and the like. In some embodiments, the host computing device 214 is interconnected with other host computing devices in a distributed, or pooled, fashion, and such devices may provide several different types of computing resources beyond that which are provided and/or enabled by the cryptographic interface controller 202.

As illustrated, in some embodiments, the cryptographic interface controller 202 connects with cryptographic computation engine 204 through physical hardware layer (PHY) 206. The cryptographic computation engine 204 may be a hardware device, such as a secure cryptoprocessor (e.g., a cryptographic smart card or a trusted platform module (TPM)), a hardware security module (HSM), a software implementation (such as a software-emulated smart card), or some combination of the two (e.g., cryptographic processing capabilities of a hardware general purpose CPU, graphics processing unit (GPU), or heterogenous processor, as enabled through a software application). In some embodiments, the cryptoprocessor is a processor implementing Intel Secure Guard eXtension, ARM TrustZone, or similar capabilities, such as the ability to perform cryptographic operations in an enclave, or another processor that is able to perform cryptographic operations in a secure execution environment. In some embodiments, therefore, the PHY 206 may be configurable to interface in a fashion appropriate to a cryptographic computation engine to which the cryptographic interface controller 202 is connected. By way of example, in embodiments where the cryptographic computation engine is or is resident on a network-attached hardware security module (HSM), the cryptographic interface controller 202 may physically interface with the cryptographic computation engine 204 by way of a network interface constituting all or part of PHY 206. It is contemplated that in some embodiments, the PHY 206 may be optional. For example, in some of such embodiments, the cryptographic computation engine 204 may be resident on the cryptographic interface controller 202 itself, or, in other embodiments, may be associated with or part of the host computing device 214 (and thus utilize bridge controller 212).

The processor 208 and memory 120 of the cryptographic interface controller 202 may be of any suitable type capable of carrying out the functions of the cryptographic interface controller 202, as further described herein. For example, the processor 208 may be a network processor, an application-specific integrated circuit (ASIC), a system-on-a-chip (SoC), or the like. It is contemplated that the processor 208, either alone or in tandem with the bridge controller 212, may in some embodiments be capable of generating hardware-emulated interfaces that are indistinguishable from a physical hardware interface to the host computing device 214. For example, the processor 208 (and in some embodiments, the bridge controller 212) may generate an arbitrary number of standard hardware interface-based devices (such as Universal Serial Bus (USB), Firewire, PCI Express, PCI, Thunderbolt, and the like) upon a request to generate such devices, and present them to the host computing device 214 as fully compatible with the appropriate standard hardware interface specification. In some embodiments, the processor 208 may be programmed such that the nature and functionality of a generated hardware-emulated device, the type of emulated hardware interface apportioned to the device, or both, are software programmable via, for example, an application programming interface (API) provided or otherwise enabled by the host computing device 214. In some embodiments, the memory 120 contains instructions to create specific types of hardware-emulated devices and/or emulated hardware interfaces upon request, e.g., received from the host computing device 214. In some embodiments, such instructions, and in some cases the functionality capable of being requested, is intentionally limited such that the overall surface of vulnerability (i.e., exposure of secure information to attack) of the cryptographic interface controller 202 is reduced, thereby increasing its inherent security ("hardening").

Figure 3:
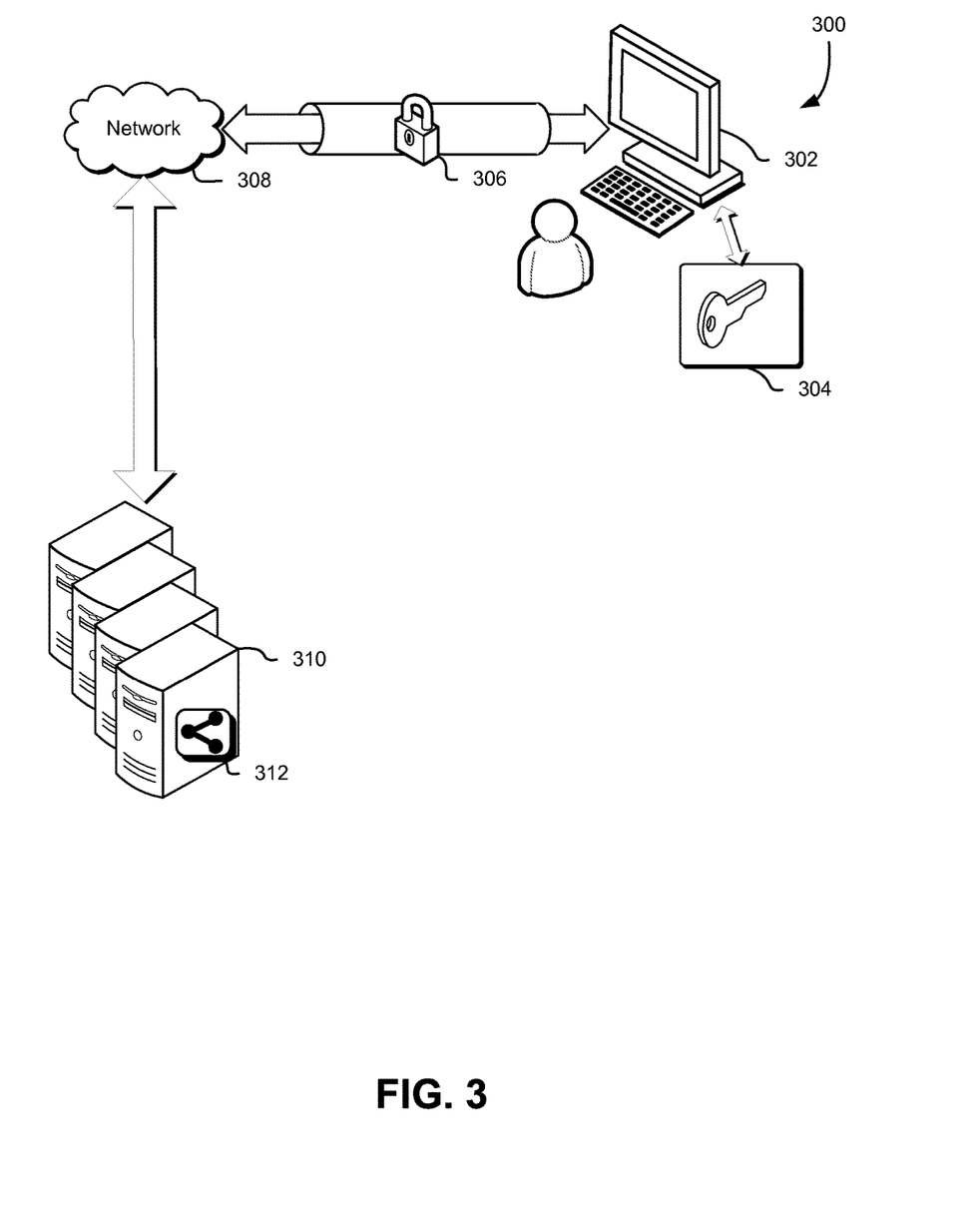
FIG. 3 illustrates an example environment for the implementation of a cryptographic interface controller with a customer-controlled cryptographic device in accordance with some embodiments.

FIG. 3 provides an illustrative example of an environment 300 in which a cryptographic interface controller, such as that described in connection with FIG. 1 above, may be implemented. In particular, FIG. 3 illustrates an example where a customer computing entity 302 is associated with a customer cryptographic device 304, such as a physical cryptographic device 104 described in connection with FIG. 1 and/or a cryptographic computation engine 204 described above in connection with FIG. 2. In some embodiments and as illustrated in FIG. 3, both the customer computing entity 302 and the customer cryptographic device 304 are under control of a customer. The customer computing entity 302 may be of any appropriate kind, such as a physical server or workstation, or one or more computing instances of a computing resource service provider. While the present disclosure focuses on requests submitted by customers of the computing resource provider, such requests may originate from another entity, such as a provider of distributed computing resources, a third party, or of an internal or backend process of the customer, the provider, or third party. Furthermore, while the present disclosure focuses on operable connectivity of hardware-emulated cryptographic devices to virtual computing systems, connectivity and/or attachment to other types of computing entities are contemplated herein. Such computing entities may include, for example, discrete computing entities, such as servers, workstations, laptops, and the like, and such discrete computing entities may be under the control of the customer, a provider of distributed computing resources, a third party, or a combination thereof.

The customer cryptographic device 304 may be any device in software or hardware that is capable of storing or manipulating cryptographic information. Examples include cryptoprocessors (such as TPMs and smart cards), hardware security modules (HSMs), third party cryptographic services to which the customer has a connection, software cryptographic engines stored or otherwise connected to the customer computing entity 302, and the like. Cryptographic devices may be configured with hardware secrets that are securely stored within hardware. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

In some embodiments, such as embodiments using public-key or asymmetric cryptography, the private key of the asymmetric key pair resides on the customer cryptographic device 304. In some embodiments, the customer cryptographic device 304 interfaces with the customer computing entity 302 using an interface that disallows access to private or secret keys stored on the customer cryptographic device 304. An example of such interfaces is the Cryptoki API of the Public-Key Cryptography Standards' (PKCS) PKCS#11 standard. Such interfaces may disallow access to protected information (such as private or secret keys) because there is no command that can be issued to cause the device to provide a copy of the private key. Generally, there may not exist a programmatic way of getting a copy of the private key via the interface and, generally, obtaining the key (or other protected information) requires extraordinary effort, such as the use of electron microscopes.

The customer computing entity 302 connects, in some embodiments, through a secured connection 306 via network 308 to computing resource service provider 310. The secured connection 306 may be secured using Transport Layer Security (TLS), Secure Sockets Layer (SSL), or any other appropriate security protocol for secure communication of data. In some embodiments, a TLS protocol, such as defined in Request for Comments (RFC) 5246, RFC 2246, RFC 4279, RFC 6347, RFC, 5238, RFC 6083, RFC 5764 and RFC 6176, which are incorporated herein by reference, is used to establish a secure channel. Other protocols such as secure sockets layer (SSL) and other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake. The network 308 may be the Internet, an intranet, a wide area network, a local area network, or some combination thereof allowing connection between the customer endpoint and the computing resource service provider 308. It is contemplated that if communication between the customer computing entity 302 and the computing resource service provider 308 consists of already encrypted data (e.g., if the customer cryptographic device 304 is sufficiently hardened to be incapable of providing a private key stored thereon), the secured connection 306 may be optional and an unsecured connection may suffice. In some embodiments, the hardened customer cryptographic device by disallowing access to protected information (such as private or secret keys) because there is no command that can be issued to cause the device to provide a copy of the private key. Generally, there may not exist a programmatic way of getting a copy of the private key from the device and, generally, obtaining the key (or other protected information) from the device requires extraordinary effort, such as the use of electron microscopes.

The computing resource service provider 310 may have one or more cryptographic interface controllers 312 installed in or otherwise connected to its computing resources. Such computing resources may include servers, network appliances, storage appliances, or any abstraction thereof. The cryptographic interface controller 312 may be installed in a PCI or PCIe slot of, for example, a server, thereby connecting the cryptographic interface controller 312 with the computing resource via a PCI or PCIe data bus, respectively. In some embodiments, a computing resource service provider may implement routines that allow the provider, or a computing resource, to cause the cryptographic interface controller(s) to generate hardware-emulated cryptographic devices, in a fashion similar to that described in FIGS. 1 and 2. In a distributed computing environment, such hardware-emulated cryptographic devices may be attached to the computing entity in which the cryptographic interface controller(s) reside(s), to some abstraction thereof (such as a virtual computing system of that computing entity), or to another computing entity or abstraction thereof within the distributed framework (i.e., to a computing entity other than the one to which the cryptographic interface controller is physically attached). Multiple hardware-emulated cryptographic devices may be attached to a given computing entity. Conversely, multiple computing entities may be attached to a given hardware-emulated cryptographic device.

A customer, e.g., through its customer computing entity 302, may request a computing resource service provider 310 to provision a hardware-emulated cryptographic device, so as to utilize the credentials associated with the customer's attached customer cryptographic device 304 on virtual computing systems provided by the distributed computing provider 310, thereby providing such virtual computing systems with similar security or credentials as that afforded to the customer computing entity 302 by the customer cryptographic device 304. In some embodiments, virtual computing systems are provided by the computing resource service provider 310 by allocating a subset of the computing resource service provider's hardware to a requesting customer computing entity and enabling customer interaction and management of the allocated subset of hardware via a programmatic interface. In some embodiments, at a time after receiving such a request, the computing resource service provider 310 may provision a hardware-emulated cryptographic device to interface with a virtual computing system which, in certain embodiments, may also be provided by the computing resource service provider. However, it is contemplated that a customer may request a hardware-emulated cryptographic device independently of attachment to virtual computing systems or other computing resources (or abstractions). For example, a customer may have credentials or other cryptographic information resident on a plurality of customer cryptographic devices 304 and may wish to store, mirror, or otherwise forward some or all of the disparate cryptographic information on one or more specified hardware-emulated cryptographic devices, so as to simplify and ease access to such cryptographic information. Such requests may be in the form of an API call, a remote procedure call (RPC), or similar. The requests may be in the form of a web services request.

In some embodiments, at a time after a provisioned hardware-emulated cryptographic device receives cryptographic operation requests, e.g., on behalf of the customer, the computing resource service provider determines the appropriate customer cryptographic device 304 to which the requested cryptographic operation pertains, and forwards the requests and associated data (e.g., cleartext to be encrypted) to that customer cryptographic device 304. After receiving processed data or, in certain embodiments, results of the requested operation back from the relevant customer cryptographic device 304, the processed data or received results are stored on, transits through, or are otherwise associated with the hardware-emulated cryptographic device to be provided to the requester (e.g., a virtual computing system or other computing entity). In some embodiments, these transactions take place using the standards and techniques described above in connection with FIGS. 1 and 2. For example, the hardware-emulated cryptographic device may appear to the computing entity to which it is attached as a standard USB PKCS#11 device, and therefore communicate with the computing entity and the applications, operating system, etc. stored thereon in a manner indistinguishable from that of any standard USB PKCS#11 device. As another example, transactions between the cryptographic interface controller and the customer endpoint(s) (e.g., the customer computing entity 302 or the associated customer cryptographic device(s) 304) may be over an Internet connection secured using TLS.

It may be appreciated that in some embodiments, a customer's private or secret cryptographic information (e.g., a private key of an asymmetric key pair) need not be communicated to a computing resource service provider for a hardware-emulated cryptographic device to "stand in" for the customer's manner of authentication (e.g., the customer cryptographic device(s) 304). However, in some embodiments, the customer may desire that rather than forward cryptographic operations requests to a customer cryptographic device, the computing resource service provider performs the cryptographic operations itself, using credentials provided by or on behalf of the customer. In some of such embodiments, a customer may endeavor to encrypt a private or secret key under its control with a certificate or public key associated with the cryptographic interface controller 312 using, for example, the customer computing entity 302. In such embodiments, a customer may pass the encrypted key to the cryptographic interface controller 312 over a suitable connection, whereupon the cryptographic interface controller 312 decrypts the customer's private or secret key using the cryptographic interface controller's own private key (i.e., the private key associated with the cryptographic interface controller's public key with which the customer initially encrypted its private key). The customer's private key may then be stored upon or otherwise associated with a provisioned hardware-emulated cryptographic device and, in some embodiments, uses a hardened API such as Cryptoki to provide similar security to the analogous hardware-hardened cryptographic device.

In some embodiments, the cryptographic interface controller 304 may itself be hardened, such as described above in connection with FIGS. 1 and 2. In such embodiments, the functionality provided by the cryptographic interface controller is limited to an analogous extent as the hardware-emulated cryptographic devices it is capable of generating, or, in some cases, to that of the customer cryptographic devices. In some embodiments, such intentional limitations allow a provider to, for example, provide hardware-backed assurances that hardware-emulated cryptographic devices customers request are similarly secure to that of the underlying cryptographic interface controller and/or that of the customer's cryptographic devices. In some embodiments, such limitations may include inability for any entity to request a private or secret key (or other sensitive cryptographic information) stored on the cryptographic interface controller. Another example of such limitations is integration of physical intrusion detection (e.g., the automatic destruction of keys or other sensitive cryptographic information stored on the cryptographic interface controller upon detection of a compromise to the physical chassis in which it is installed or, in some cases, upon physical detachment therefrom).

In some embodiments, the cryptographic interface controller 304 may be implemented in such a fashion as to satisfy the requirements of an operating system's native encryption and/or secured boot capabilities. Examples of such native encryption and secured boot capabilities include the Secure Boot protocol of the Universal Extensible Firmware Interface (UEFI) specification, Microsoft BitLocker, and the like. In some embodiments, at a time after receiving a request to generate a hardware-emulated cryptographic device for use in activating or enabling security and/or encryption functions of an operating system running, for example, within an instance of the computing resource service provider's computing entities, the cryptographic interface controller 304 provides a hardware-emulated cryptographic device configured in such a way as to be recognized by the operating system (e.g., as a standard PKCS#11 device, such as a smart card) to enable such security or encryption capabilities. In such embodiments, the actual credentials may be "forwarded" from a physical cryptographic device under the customer's control (such as described in connection with this FIG. 3), or, in some embodiments, provided by the computing resource service provider.

Figure 4:
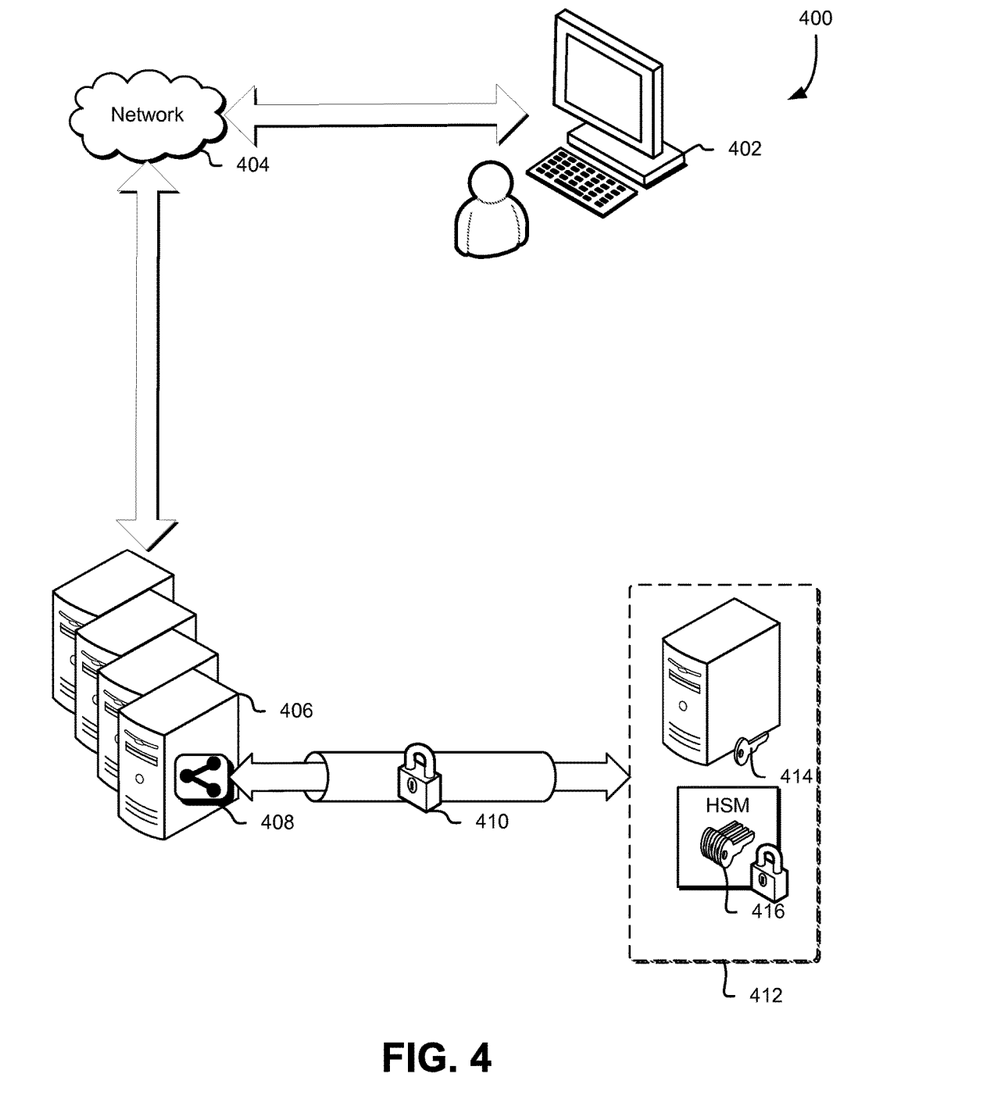
FIG. 4 illustrates an example environment for the implementation of a cryptographic interface controller with a cryptographic device under provider control in accordance with some embodiments.

FIG. 4 illustrates an implementation of a cryptographic interface controller 408 within an environment 400 where one or more cryptographic device(s) 412 are accessible to a computing resource service provider 406 without transiting through a customer device 402 or its associated computing entities, according to some embodiments. In some embodiments, a customer device 402, through its associated computing entities, connects through network 404 to computing resource service provider 406. Computing resource service provider 406 may control a plurality of computing entities in a distributed network. One or more of the computing entities may implement a cryptographic interface controller 408 in a manner similar to that previously described in FIGS. 1 through 3. In some embodiments, the cryptographic interface controller 408, either directly or indirectly, connects through secure connection 410 to one or more cryptographic devices 412. Such cryptographic devices may include cryptographic operations services 414 and/or one or more cryptoprocessors or HSMs 416, or other types of devices as discussed above in connection with FIGS. 1-3. Cryptographic operations services 414 may be computer systems that receive and process requests to perform cryptographic operations and may include third-party cryptographic operations capabilities, distributed networks of cryptoprocessors, heterogenous networks of cryptographic devices, and the like. Such services may implement functionality using software, hardware, or some combination thereof, and may provide cryptographic operations services (such as credential and cryptographic key storage and protection) using programmatic methods, such as APIs.

In some embodiments, the customer device 402 may also directly interface with the cryptographic devices 412. In some of such embodiments, the customer device 402 may interface with, for example, a cryptographic operations service 414 (e.g., through an API), to encrypt a customer's private or secret key that is necessary to, for example, decrypt encrypted data. In such embodiments, at a time after receiving a request from the customer device 402 to generate a hardware-emulated cryptographic device using the customer's private or secret key, the cryptographic interface device 408 communicates with cryptographic operations service 414 so as to synchronize and identify the private key used by the cryptographic operations service 414 to encrypt the customer's private or secret key. At a time after receiving the encrypted private or secret key from the customer device 402, the cryptographic interface device 408 decrypts the private or secret key using the synchronized and identified cryptographic operations service's private key, thereby having the customer's decrypted private key. Thus, the customer's private key may be loaded onto or otherwise associated with a hardware-emulated cryptographic device generated by the cryptographic interface controller for manipulation by the customer according to techniques previously described in connection with FIGS. 1-3. Accordingly, a customer need only provide the encrypted private key to the computing resource service provider 406.

It is contemplated that in such embodiments, the computing resource service provider 406 controls, or otherwise are in a trusted and/or mutually authenticated relationship with the cryptographic devices 412. For example, a cryptographic interface device 408 may provide, as a part of the authentication process, information regarding its current operational state. Such information may include a checksum or hash value associated with software, firmware, or both (e.g., as generated using the SHA/1 cryptographic hash function), auxiliary authentication or state information such as would be provided by a TPM associated with the physical chassis in which the cryptographic interface device 408 resides, and the like. In such examples, such values and/or states may be checked against a list or database of known good values and/or states, which may be persisted by any appropriate authority, which may include the customer, the computing resource service provider, or a third party auditor. Similar techniques may be used with HSMs 416 in these and other embodiments.

In some embodiments, the cryptographic interface controller 408 may "forward" cryptographic operations requests to cryptographic devices 412, then returns the results to the requester via a hardware-emulated cryptographic device generated by the cryptographic interface controller 408, using techniques similar to that described in connection with FIG. 3. In such embodiments, a customer may request a computing resource service provider 406 to generate a hardware-emulated cryptographic device, in some embodiments attached to a computing instance of the computing resource service provider 406, such that the computing instance is enabled to perform cryptographic operations using credentials specific to that customer. In such embodiments, at a time receiving the request, the computing resource service provider 406 causes the cryptographic interface controller 408 to generate a hardware-emulated cryptographic device.

The computing resource service provider 406 then instructs a cryptographic device 412, such as a cryptographic operations service 414, to generate and/or assign a private or secret key on behalf of the requesting customer. Such instruction may require mutual authentication between the computing resource service provider 406 (e.g., via the cryptographic interface device 408) and the cryptographic device 412, and such operations may also require verification (e.g., by digital signature) of the customer's identity. Thereafter, at a time after receiving the customer's request for cryptographic operations (e.g., through a provisioned computing instance having the hardware-emulated cryptographic device attached therewith), data associated with the request is forwarded to the cryptographic device such that the assigned credentials are used by the cryptographic device (e.g., the cryptographic operations service) to perform the request. After the requested operation is completed, the results of such an operation are provided back to the hardware-emulated cryptographic device, in a fashion similar to that described in connection with FIG. 3.

Figure 5:
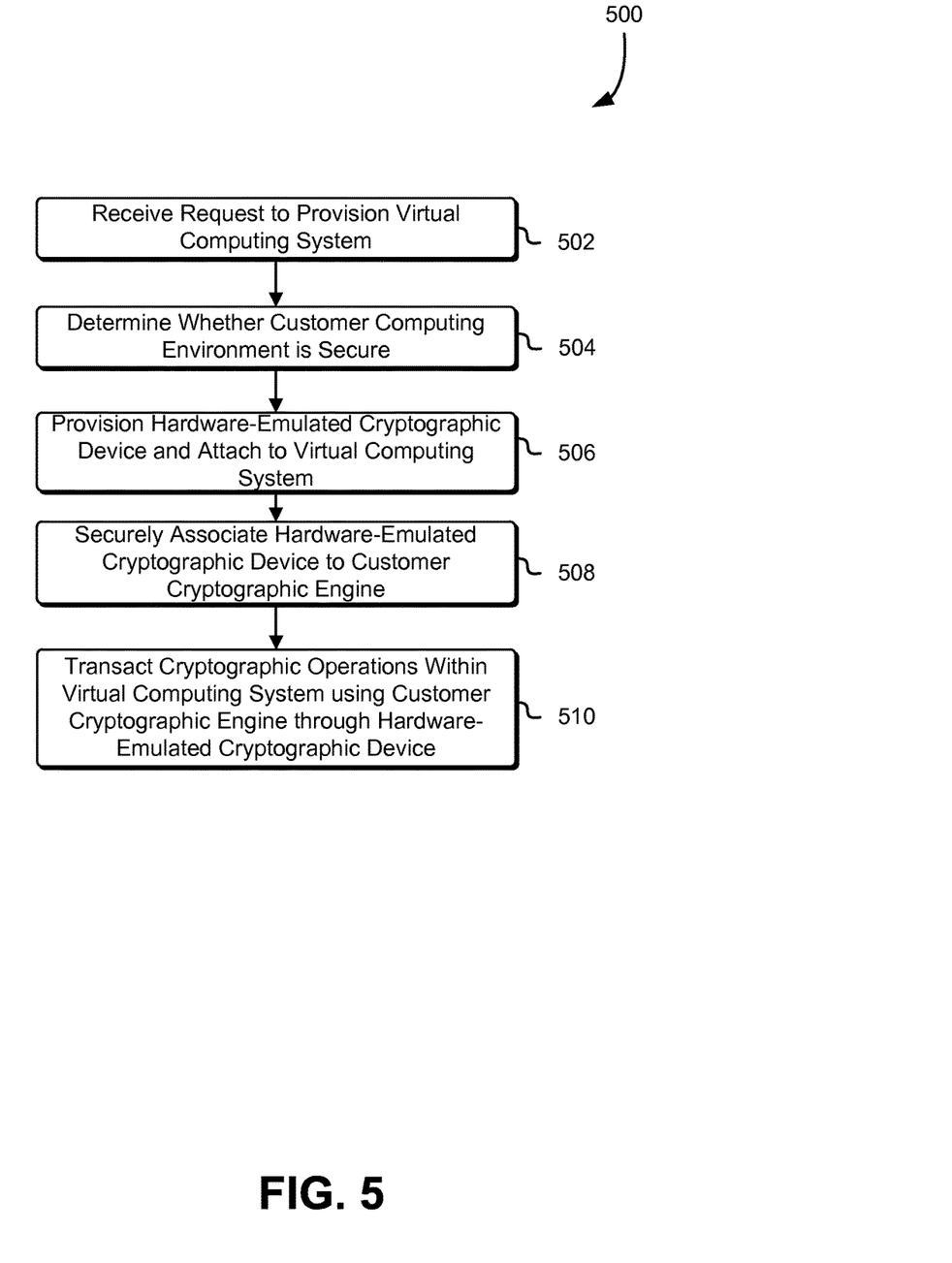
FIG. 5 illustrates an example process for using a cryptographic interface controller to process cryptographic requests using a client-attached cryptographic device, in accordance with some embodiments.

FIG. 5 illustrates an example process 500 for utilizing a hardware-emulated cryptographic device in environments implementing a cryptographic interface device and in which a customer controls a customer cryptographic device, in accordance with some embodiments. At step 502, a computing resource service provider, such as the computing resource service provider 310 described above in connection with FIG. 3, receives a request to provision a secured computing instance, e.g., from a customer similar to that described above in connection with FIGS. 1-4. At step 504, the computing resource service provider (or in some embodiments, a third party auditor) determines whether aspects of the customer's environment, such as the security of its connection to the computing resource service provider, are sufficiently secure for transaction of sensitive cryptographic information. It may be appreciated that in embodiments where cryptographic operations requests that transit between the computing resource service provider and the customer contain no unencrypted information, such a determination of security may be superfluous.

At step 506, after receiving the request described in step 502, the computing resource service provider provisions a hardware-emulated cryptographic device, e.g., using the capabilities of a cryptographic interface controller such as the cryptographic interface controller 202 described in connection with FIG. 2 (and/or the cryptographic interface controller 312 described in connection with FIG. 3), and attaches or otherwise associates the provisioned hardware-emulated cryptographic device with a computing entity, such as a virtual computing system of the computing resource service provider (using similar techniques described in connection with at least FIG. 3). At step 508, the provisioned hardware-emulated cryptographic device is associated with, for example, a customer cryptographic device such as that described in connection with FIG. 3. Thereafter, at step 510, requests to perform cryptographic operations, through the hardware-emulated cryptographic device and the cryptographic interface controller, are communicated thereon to the associated customer cryptographic device for processing, and the processed requests (e.g., data, confirmations, or authentication associated with such requests) are propagated through the hardware-emulated cryptographic device to the computing entity with which it is associated.

Figure 6:
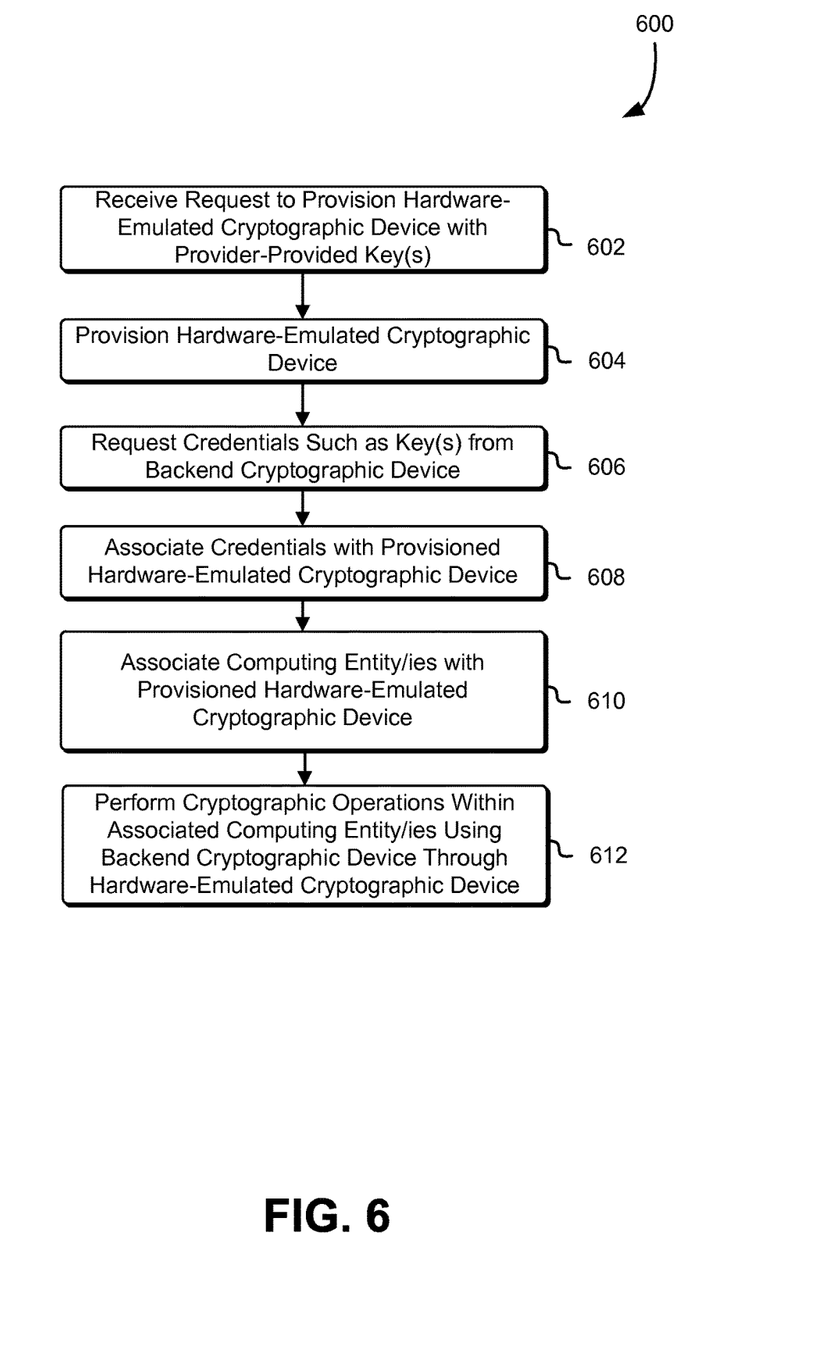
FIG. 6 illustrates an example process for using a cryptographic interface controller to process cryptographic requests using a provider-controlled cryptographic computation engine, in accordance with some embodiments.

FIG. 6 illustrates an example process 600 for utilizing a hardware-emulated cryptographic device in environments implementing a cryptographic interface device and in which a distributed computing provider transacts with a cryptographic device to provision keys on the customer's behalf, in accordance with some embodiments. At step 602, a provider of cryptographic services, for example a computing resource service provider as described above in connection with FIGS. 1-4, receives a customer request to provision a hardware-emulated cryptographic device using credentials provided by the provider on behalf of the requesting customer. At step 604, in response to the request, the computing resource service provider provisions a hardware-emulated cryptographic device, e.g., using the capabilities of a cryptographic interface controller such as the cryptographic interface controller 202 described in connection with FIG. 2 (and/or the cryptographic interface controller 312 described in connection with FIG. 3), and attaches or otherwise associates the provisioned hardware-emulated cryptographic device with a computing entity, such as a virtual computing system of the computing resource service provider (using similar techniques described in connection with at least FIG. 3).

At step 606, the provider initiates a request to a cryptographic device, such as a cryptographic operation service, HSF, or other type of cryptographic computation engine and/or cryptoprocessor, to provide credentials on behalf of the client. Such devices or services may include, or have characteristics similar to, the cryptographic devices discussed in connection with at least FIG. 4. Thereafter, at step 608, the provisioned credentials are associated or mapped to the hardware-emulated cryptographic device, and at step 610, one or more computing entities are associated with the hardware-emulated cryptographic device. As previously discussed in connection with FIGS. 1-4, such computing entities may include computing instances generated by the provider, which may operate a distributed computing environment. At step 612, when the computing entity requests cryptographic operations of the hardware-emulated cryptographic device associated with it in step 610, such operations are forwarded to the cryptographic device associated in step 606 for processing. Results and/or data associated with the cryptographic operation are returned to the hardware-emulated cryptographic device and presented to the computing entity attached therewith.

Figure 7:
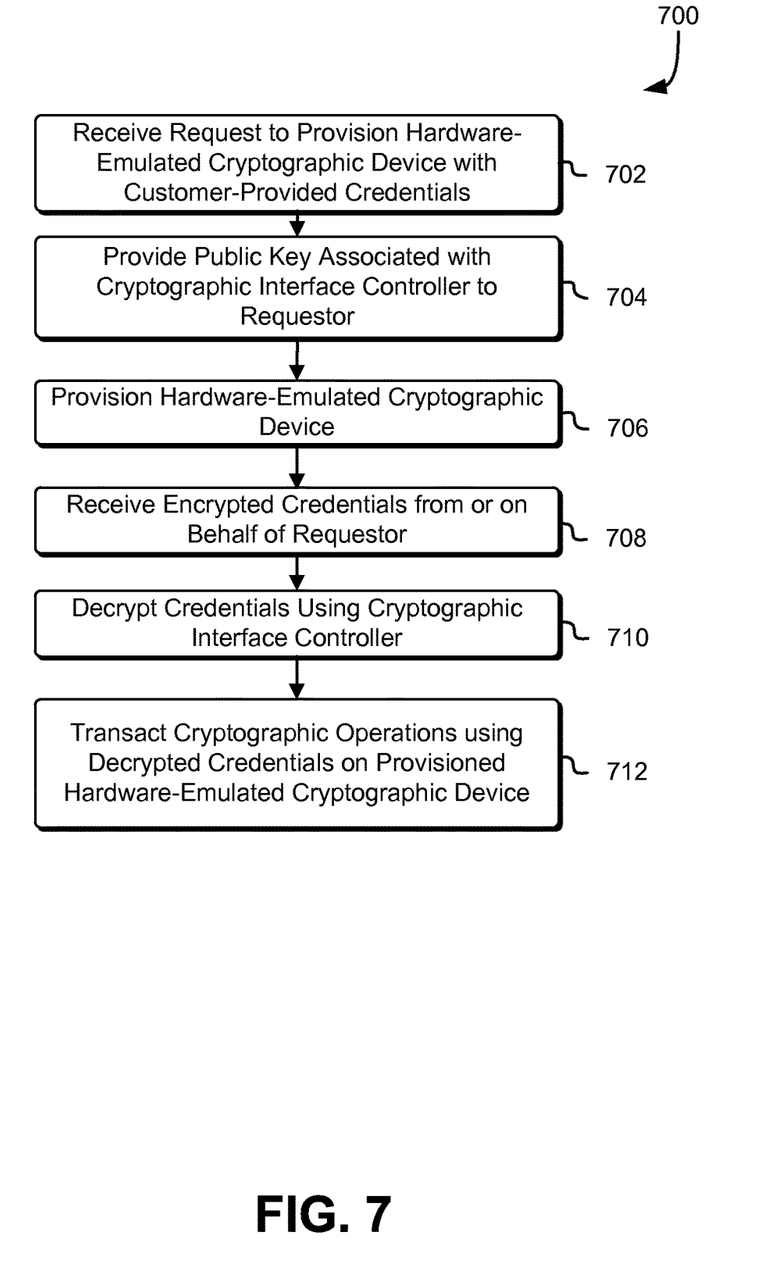
FIG. 7 illustrates an example process for using a cryptographic interface controller to process cryptographic requests using resources of the cryptographic interface controller, in accordance with some embodiments.

FIG. 7 illustrates an example process for securely providing a cryptographic interface controller of a provider with a customer's private or secret credentials, in accordance with some embodiments. At step 702, a provider of cryptographic services, for example a computing resource service provider as described above in connection with FIGS. 1-6, receives a customer request to provision a hardware-emulated cryptographic device using credentials provided by the customer. As previously discussed, such credentials may be secret or private keys of the customer. At step 704, the provider provides the requestor (e.g. the customer) with a public key or other cryptographic information associated with a cryptographic interface controller so as to enable the requestor to encrypt its private or secret credentials. At step 706, the provider generates a hardware-emulated cryptographic device using a cryptographic interface controller, using techniques similar to that previously discussed. At step 708, the cryptographic interface controller receives encrypted credentials from, or on behalf of, the requestor. Using techniques similar to those previously discussed, the requestor uses the cryptographic information provided in step 704 to encrypt its private or secret credentials. At step 710, these encrypted credentials are received by the provider and decrypted by, for example, the cryptographic interface controller associated with the cryptographic information provided to the requestor in step 704. Thereafter, at step 712, further cryptographic operations requested by or on behalf of the initial requestor (e.g., the customer) are transacted directly by the cryptographic interface controller, using the hardware-emulated cryptographic device initially provisioned in step 706, which has the requestor's decrypted private or secret credentials as acquired and processed in accordance with steps 704, 708 and 710.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 8:
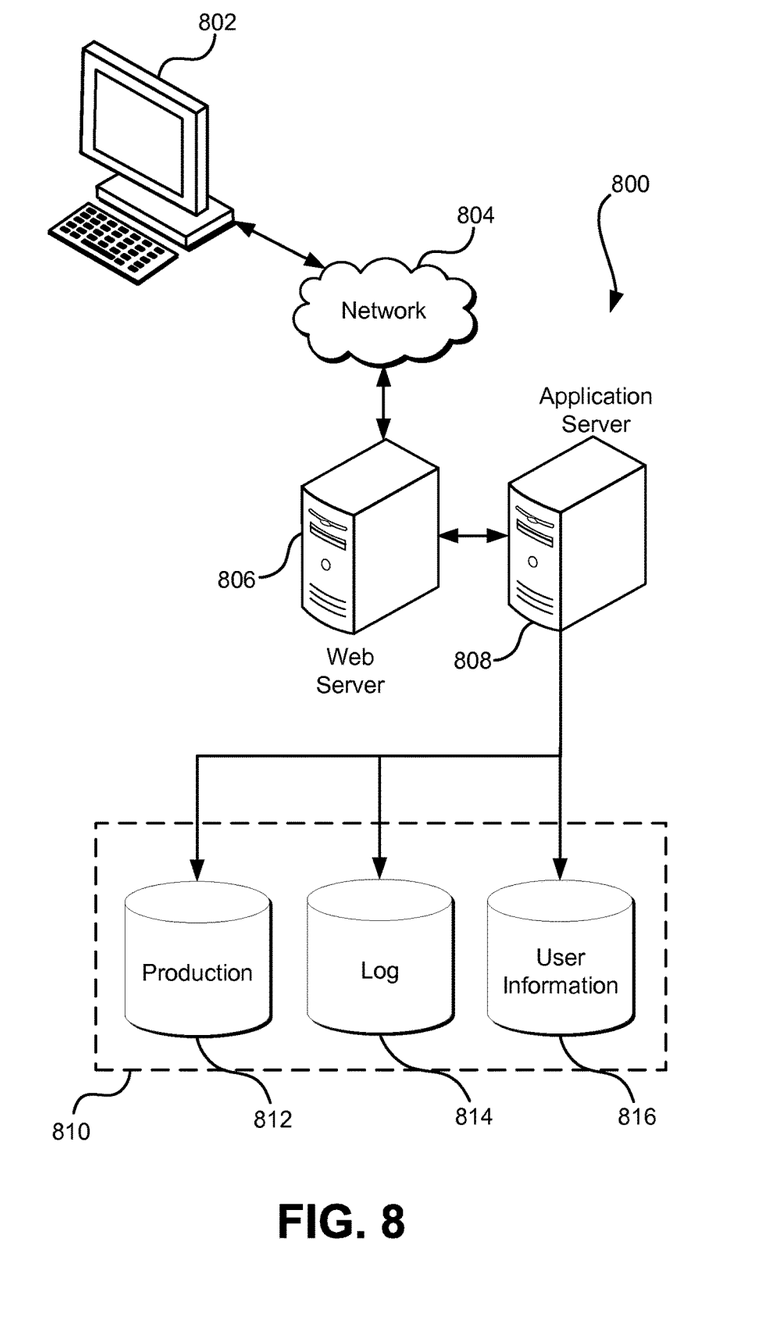
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems of a computing resource service provider configured with executable instructions,
   receiving, from a customer computing entity of the computing resource service provider, a request to provision a virtual computing system with a virtual smartcard;
   fulfilling the request by at least:
   provisioning the virtual computing system;
   provisioning a hardware-emulated cryptographic device using a cryptographic interface controller operatively connected to the one or more computer systems;
   operatively connecting the hardware-emulated cryptographic device with the customer computing entity and the virtual computing system; and
   operatively connecting, using at least the cryptographic interface controller, the hardware-emulated cryptographic device with a second cryptographic device, the second cryptographic device managing a cryptographic key such that the cryptographic key is inaccessible to the computing resource service provider, the second cryptographic device being operable to perform cryptographic operations using the cryptographic key;

responding to a cryptographic operation request by at least:

forwarding data associated with the cryptographic operation request from the hardware-emulated cryptographic device for processing by the second cryptographic device, the processing including one or more requested cryptographic operations requiring the cryptographic key; and providing, to the customer computing entity via the virtual computing system, the processed data.

2. The computer-implemented method of claim 1, wherein the virtual computing system is hosted by the computing resource service provider and is programmatically managed by the customer computing entity.

3. The computer-implemented method of claim 1, wherein the second cryptographic device is a physical cryptographic smart card.

4. The computer-implemented method of claim 1, wherein the hardware-emulated cryptographic device is operably connected with the customer computing entity using a standard hardware interface provided by the cryptographic interface controller.

5. The computer-implemented method of claim 1, wherein the hardware-emulated cryptographic device is programmatically indistinguishable by the virtual computing system from the second cryptographic device.

6. A system of a computing resource service provider, comprising:

at least one cryptographic interface controller having a hardware communications interface and being operable to generate a hardware-emulated cryptographic device capable of communicating via the hardware communications interface;

one or more processors operatively connected to the cryptographic interface controller;

memory including instructions executable by the one or more processors to cause the system to at least:

in response to receiving a request to provision a virtual smartcard, provision the hardware-emulated cryptographic device by at least:

causing the cryptographic interface controller to generate the hardware-emulated cryptographic device;

identifying, using a cryptographic computation engine, one or more encryption keys; and associating the one or more encryption keys with the hardware-emulated cryptographic device; and cause the hardware-emulated cryptographic device to service the request via the hardware communications interface by at least:

operating the cryptographic computation engine to perform the requested cryptographic operations using the one or more associated encryption keys; and providing results of the cryptographic operations via the hardware communications interface.

7. The system of claim 6, wherein the hardware-emulated cryptographic device is a Public Key Cryptographic Standards-compliant device.

8. The system of claim 7, wherein:

the hardware communications interface is a Universal Serial Bus interface, and the PKCS-compliant device is a standard USB device.

9. The system of claim 6, wherein the cryptographic computation engine is under physical control of a customer of the computing resource service provider.

10. The system of claim 6, wherein the cryptographic computation engine is a hardware security module (HSM) under physical control of the computing resource service provider.

11. The system of claim 6, wherein the cryptographic computation engine is a programmatic cryptographic security service provided by the computing resource service provider.

12. The system of claim 6, wherein the requested cryptographic operations are performed by the cryptographic interface controller.

13. The system of claim 6, wherein:

the cryptographic computation engine is separate from the cryptographic computation device, and the requested cryptographic operations are performed by the cryptographic computation engine.

14. The system of claim 6, wherein the hardware-emulated cryptographic device is associable to at least one computing instance provided by the computing resource service provider.

15. A non-transitory computer-readable storage medium having stored thereon executable instructions that, when executed by one or more processors of a first computer system, cause the first computer system to at least:

in response to a first request to provision a virtual smartcard, provide, to applications executing on a second computer system, access to a hardware-emulated cryptographic device;

in response to receiving a second request to perform a cryptographic operation on the hardware-emulated cryptographic device, the second request being received through an application programming interface of the applications executing on the second computer system, respond to the second request by at least:

sending at least a portion of the second request to a cryptographic computation engine for processing, the cryptographic computation engine having one or more cryptographic keys inaccessible to the first or the second computer systems; and submitting the processed portion of the second request, so as to present the hardware-emulated cryptographic device as having processed the second request.

16. The non-transitory computer-readable storage medium of claim 15, wherein the data bus is a Universal Serial Bus.

17. The non-transitory computer-readable storage medium of claim 15, wherein:

the one or more cryptographic keys includes a private key of an asymmetric key pair, and the private key is under control of a customer of the first computer system.

18. The non-transitory computer-readable storage medium of claim 17, wherein the cryptographic processor is physically separate from the first or second computer systems.

19. The non-transitory computer-readable storage medium of claim 15, wherein the data bus is one of a Peripheral Component Interconnect bus or a Peripheral Component Interconnect Express bus.

20. The non-transitory computer-readable storage medium of claim 15, wherein the hardware-emulated cryptographic device provides an application programming interface compliant with Public Key Cryptography Standards.

* * * * *